United States Patent
Palmer, Jr. et al.

(10) Patent No.: US 10,787,580 B2
(45) Date of Patent: *Sep. 29, 2020

(54) AQUEOUS ALKYD RESIN EMULSIONS CONTAINING NON-FUGITIVE, REACTIVE EMULSIFYING SURFACTANTS

(71) Applicant: Ethox Chemicals, LLC, Greenville, SC (US)

(72) Inventors: Charles Francis Palmer, Jr., Greer, SC (US); Lester A. Haney, II, Greer, SC (US)

(73) Assignee: Ethox Chemicals, LLC, Greenville, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/018,766

(22) Filed: Feb. 8, 2016

(65) Prior Publication Data

US 2016/0152835 A1 Jun. 2, 2016

Related U.S. Application Data

(63) Continuation of application No. 14/217,381, filed on Mar. 17, 2014, now Pat. No. 9,255,206.

(60) Provisional application No. 61/789,298, filed on Mar. 15, 2013.

(51) Int. Cl.
| | | |
|---|---|---|
| *C09D 7/45* | (2018.01) | |
| *C09D 167/08* | (2006.01) | |
| *C09D 7/65* | (2018.01) | |
| *C09D 5/02* | (2006.01) | |
| *C08L 67/08* | (2006.01) | |
| *C08G 65/326* | (2006.01) | |
| *C08G 65/327* | (2006.01) | |
| *C08G 65/26* | (2006.01) | |
| *C08G 65/14* | (2006.01) | |
| *C09D 167/06* | (2006.01) | |
| *C08L 71/02* | (2006.01) | |

(52) U.S. Cl.
CPC ............... *C09D 7/45* (2018.01); *C08G 65/14* (2013.01); *C08G 65/2612* (2013.01); *C08G 65/326* (2013.01); *C08G 65/327* (2013.01); *C08L 67/08* (2013.01); *C09D 5/022* (2013.01); *C09D 5/027* (2013.01); *C09D 7/65* (2018.01); *C09D 167/06* (2013.01); *C09D 167/08* (2013.01); *C08L 71/02* (2013.01)

(58) Field of Classification Search
CPC ........ C08L 67/08; C08G 63/48; C09D 167/08
See application file for complete search history.

(56) References Cited

U.S. PATENT DOCUMENTS

| | | | | |
|---|---|---|---|---|
| 4,221,685 A | * | 9/1980 | Eschwey | C09D 167/08 106/252 |
| 4,814,514 A | * | 3/1989 | Yokota | B01F 17/0057 516/76 |
| 5,391,649 A | * | 2/1995 | Holmberg | B01F 17/005 106/252 |
| 5,538,760 A | * | 7/1996 | Sharma | C08F 283/02 427/385.5 |
| 6,369,135 B1 | * | 4/2002 | Schork | C08F 2/24 523/201 |
| 9,255,206 B2 | * | 2/2016 | Palmer, Jr. | C09D 7/125 |
| 2011/0065856 A1 | * | 3/2011 | Anchor | C09D 167/08 524/539 |

OTHER PUBLICATIONS

Zoller, U. Handbook of Detergents, Part F: Production. 2009. CRC Press, Taylor & Francis Group, LLC. (Year: 2009).*
Palmer, C. F. Jr. New Reactive Surfactants for Emulsion Polymerization. The Waterborne Symposium: Proceedings of the Thirty-Ninth Annual International Waterborne, High-Solids, and Powder Coatings Symposium. Feb. 13-17, 2012. (Year: 2012).*

* cited by examiner

*Primary Examiner* — Stephen E Rieth
(74) *Attorney, Agent, or Firm* — Joseph T. Guy; Patent Filing Specialist, Inc.

(57) ABSTRACT

An aqueous alkyd resin coating composition, comprising (a) at least one alkyd resin as a dispersed phase; (b) an emulsifier based on styrenated phenols that have been converted into reactive surfactants by first reaction with one or more equivalents of an allyl glycidyl ether to provide pendant allyl groups and then oxyalkylated and (c) water. The invention also provides a method for preparing these aqueous alkyd resin coating compositions from solvent borne alkyd compositions.

22 Claims, 1 Drawing Sheet

Non-reactive surfactant
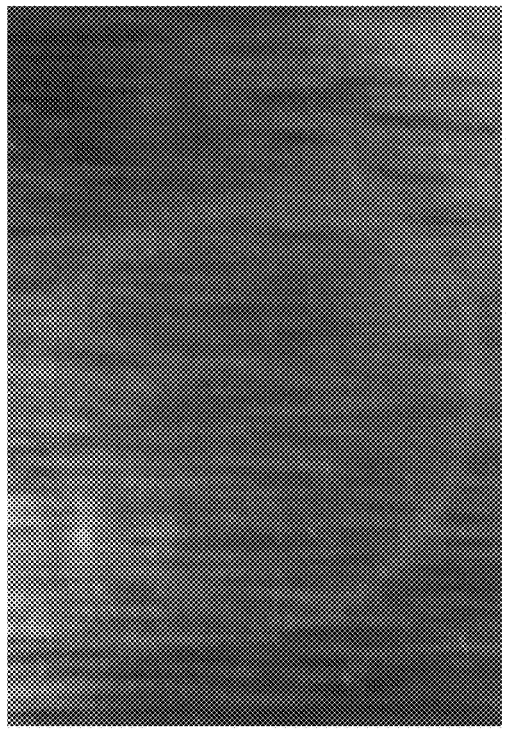
Reactive surfactant

AQUEOUS ALKYD RESIN EMULSIONS CONTAINING NON-FUGITIVE, REACTIVE EMULSIFYING SURFACTANTS

This application is a continuation of U.S. Ser. No. 14/217,381 filed Mar. 17, 2014; now U.S. Pat. No. 9,255,206 issued Feb. 9, 2016. This application also claims the priority benefit under 35 U.S.C. section 119 of U.S. Provisional Patent Application No. 61/789,298 entitled "Aqueous Alkyd Resin Emulsions Containing Non-Fugitive, Reactive Emulsifying Surfactants" filed on Mar. 15, 2013, and which is in its entirety herein incorporated by reference.

FIELD OF THE INVENTION

The subject invention pertains to aqueous alkyd resin emulsions containing non-fugitive, reactive emulsifying surfactants. The invention also relates to alkyd resin emulsions containing non-fugitive, reactive emulsifying surfactants for topcoats and to a process for their preparation.

BACKGROUND OF THE INVENTION

While no longer the largest volume vehicles in coatings, alkyd coatings are still of major importance since they are the most commonly used resin or binder system in oil-based and solvent-based coatings. Alkyd coatings are relatively inexpensive and perform well, often with fewer film defects than other coatings. They are used in many industrial and architectural applications. The hydrophobic nature of the alkyd polymer makes them good choices when water repellency is important.

Alkyd resins are polyesters generally prepared from a polyol, phthalic anhydride, and unsaturated vegetable fatty acids such as linseed, soy, or tung oil. The inclusion of the fatty acid confers a tendency to form a flexible coating. Alkyds are often categorized as long, medium, or short oil based on the amount of vegetable oil in the alkyd; long oil alkyds have more fatty acid content than short oils.

Preferred fatty acids are those known as drying oils with multiple double bonds since they will air cure to give a hard coating. This curing reaction crosslinks the oligomeric alkyd chains to build molecular weight and improve durability and other properties. Alkyds are sometimes modified with other radical reactive monomers or polymers for a number of reasons. These are included to speed curing, to improve water compatibility or solubility, or to lower viscosity.

Solvents are employed in traditional alkyd manufacture to reduce the viscosity of the oligomeric polyester and often to help remove byproduct water formed in the synthesis. These solvents include xylene or ketones. However, these solvents are classified as VOC, volatile organic compounds. In recent years, the U.S. EPA has passed stringent regulations mandating significant reductions of VOCs in alkyd coatings. Additional restrictions of VOC in coatings will be enacted in the U.S. The European Community mandated that solvent borne alkyd coatings be limited to 50 g/l VOC by 2010, thus effectively eliminating solvent borne alkyd coatings in that area.

There are several types of alkyds. The main classification is into oxidizing and nonoxidizing types. This invention is mainly concerned with the oxidizing types. Oxidizing alkyds cross-link by the same mechanisms as drying oils crosslink, that is, cross-linking through double bonds and preferably through conjugated double bonds.

A number of new technologies have been recently developed to render solvent borne alkyd coatings more environmentally acceptable by replacing some or all of the solvent with water. Alkyd resins are converted into useable waterborne products by one of two methods. One method is to graft an alkyd resin onto a latex polymer. This gives the coating properties of both polymer types. The latex polymer and the surfactant additives that are used to manufacture the latex render the latex/alkyd polymer dispersible in water, while the grafted alkyd renders alkyd-type properties such as toughness and resistance to various chemicals to the coating.

Additional processing steps are needed to make these hybrid products. The alkyd polymer needs to be of a particular type and structure in order to make a viable alkyd/latex coating. In some cases, the durability of these products is superior to those of latex polymeric coatings, but the alkyd resin chemistry must be altered to maximize the benefits of the grafted alkyd resin onto the latex backbone. These additional processing steps add cost to the product. This process also employs additives such as coalescing solvents to improve properties such as the gloss and flexibility of the coating.

Emulsification of the alkyd resin into water is the other method to remove some or all of the VOCs in the emulsified product. One of the main advantages of the emulsification process is that the alkyd resin used in this application does not necessarily need to be altered to prepare the emulsion, as long as the proper surfactant and emulsification process is used to make the product. The proper surfactant is one with the proper molecular weight, structure, and HLB (hydrophile/lipophile balance).

A number of emulsification processes are known. U.S. Pat. No. 6,780,910 Bouvy et al. describes methods to prepare alkyd emulsions. In Zukert et al. U.S. Pat. No. 3,979,346, it is proposed to prepare aqueous dispersions of alkyd resins by the use of a hydrophilic polyoxyethylene non-ionic emulsifier containing two or more unsaturated fatty alcohol or fatty acid groups, together with an anionic surfactant containing carboxylic acid groups prepared from a drying oil and maleic anhydride, which is hydrolyzed in the process. The properties of such dispersions are far from optimal, and coatings prepared therefrom may absorb water and hydrolyze. McNamee et al. in U.S. published application US 2007/0299228 disclose the use of branched polyoxyalkylene surfactants modified by reaction with an unsaturated fatty acid to contain more than one unsaturated fatty acid group. Preferred are fatty acid reaction products of polyoxyethylated sugars such as sorbitol. Due to the hydrophilic nature of the surfactant, water resistance of coatings prepared therefrom may be compromised.

There are a number of technical difficulties and limitations with the emulsification process as described in the patent literature. Usually an invert emulsion process is preferred since it is less capital intensive because it does not require high shear mixing equipment and is also easier to process since the inversion process produces less foam than shearing into water.

In the invert emulsion process, the neat alkyd with or without solvent is heated to a high enough temperature to reduce its viscosity to a manageable level. The surfactant package of choice is then added to the molten alkyd, followed by the gradual addition of hot water. As the water is added the mixture forms a water-in-oil emulsion, but as the water content increases and the emulsion nears the inversion point, "flipping" from a water-in-oil emulsion to an oil-in-water emulsion, the viscosity often becomes unmanageably high. The temperature is maintained as high as possible to reduce the viscosity of the emulsion, but this can cause problems since nonionic surfactants have lower water solubility as the temperature increases. Once the inversion point is crossed, the viscosity drops.

The solvent used to make the alkyd is often removed prior to emulsion preparation since if it is left in the emulsion it contributes to VOCs in the coating based on the waterborne alkyd. Also, if it is left in with the alkyd in emulsion preparation its later removal is often difficult or impossible since the emulsion stability is negatively affected. However, the solvent often must be left in with the alkyd emulsion to keep the viscosity at a manageable level throughout the inversion process. With solvent present through the emulsion process the alkyd does not have to be heated to as high a temperature to keep it fluid or from solidifying. Thus an emulsification method that allowed the alkyd solvent to remain through the inversion process so that lower viscosity could be achieved at lower temperatures and thus shorten production times and reduce cost, but be able to be later removed to produce a low or no VOC emulsion would be desirable.

These alkyd emulsions contain a few percent of surfactants that remain in the formulation and thus are present in the coating after application. There they can cause a number of problems. If the surfactant molecules remain unbound and free to migrate, when the dried coating later is exposed to water some of the surfactant molecules can dissolve into the water. This reduces the surface tension of the water, improves its wetting of the coating surface, and promotes its penetration through the coating. When surfactant-coated micelle spheres stack on a surface during the drying process and start to coalesce, the concentration of surfactant molecules at the intersection of micelles can become relatively high. If these surfactant molecules are not bound to the alkyd resin, upon exposure to water extraction of the surfactant takes place leading to pitting and degradation of the integrity of the coating. Damage to the substrate to be protected becomes much more likely. On metal substrates, this can lead to corrosion and loss of adhesion. In addition, free surfactants in the coating can also plasticize the alkyd and prevent its reaching maximum hardness upon curing.

Many of the problems that are caused by extractable surfactants can be mitigated if the surfactant can co-cure into the alkyd coating. This locks it into place so that it cannot be extracted by water. Therefore reactive surfactants that can co-cure with the alkyd in the air autoxidation process to become locked into the coating and avoid the above mentioned problems caused by free surfactants would be desirable.

A number of patent applications claim reactive surfactants that can do this. They usually are based on fatty acid alkoxylates in which the fatty acid has a number of double bonds similar to the drying oil fatty acids. However, most of the known ones have some significant drawbacks. They are nonionic surfactants and so have lower solubility in hot water, which limits their ability to make inverse emulsions with a manageable viscosity. Nonionics also cannot take advantage of charge stabilization mechanisms to reduce particle size and improve emulsion stability. Most known nonionics for alkyd emulsions have long ethoxylate chains to give them a high HLB which is required to make a stable emulsion. These nonionics have a strong tendency to slow drying, likely due to complexation of metal ion drying agents. Long chain nonionics also have a tendency to plasticize alkyd coatings, reducing their hardness.

The previous alkyd reactive surfactants contain hydrophobes designed to have good compatibility with the fatty acid chains of the alkyd resin; the surfactants of the instant invention were designed to have good compatibility with the aromatic groups of the polyester portion of most alkyd resins.

BRIEF DESCRIPTION OF THE FIGURES

FIG. 1 illustrates outlines of water drop on alkyd coating drawdown on a steel panel.

SUMMARY OF THE INVENTION

It has now been surprisingly discovered that improved waterborne alkyd coatings can be produced from aqueous emulsions or dispersions of alkyd resins, where the surfactant is a nonionic or anionic surfactant reactive with the alkyd resin in conventional coating processes. The surfactants are polyoxyalkylene polyethers according to structures I or II below prepared by polyoxyalkylating a polystyrenated phenol that has previously been reacted with one or more allyl glycidyl ether groups, and that after polyoxyalkylation may be optionally converted to an anionic surfactant such as a phosphate ester or a sulfate. The allyl groups pendant to the polyether chain on the surfactant provide reactive sites for participation in the alkyd autooxidative drying process.

Formula (I) is an anionic surfactant of structure:

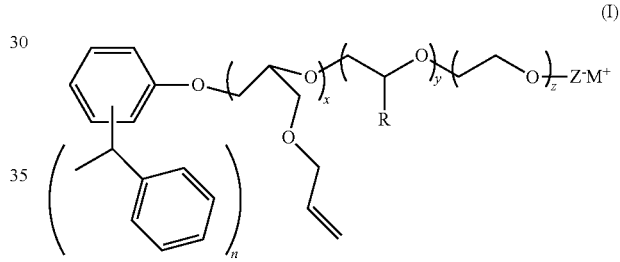

(I)

where $R=CH_3$, $CH_2CH_3$, $C_6H_5$, or $C_{14}H_{29}$; n=1,2,3; x is 1-10, y is 0-200, z is 4-200, more preferably from about 5 to 60, and most preferably from about 5 to 40; Z can be either $SO_3^-$ or $PO_3^{2-}$, and $M^+$ is $Na^+$, $K^+$, $NH_4^+$, or an alkanolamine.

The present invention is further directed towards the emulsion alkyd polymers in the presence of a nonionic surfactant of formula (II)

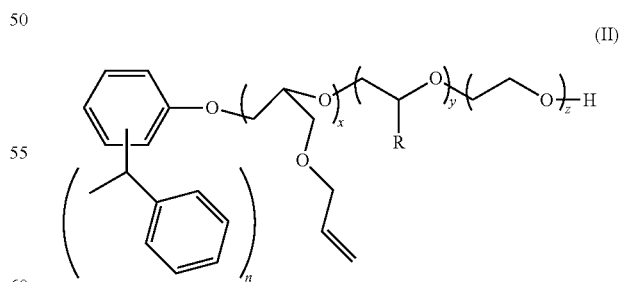

(II)

where $R=CH_3$, $CH_2CH_3$, $C_6H_5$, or $C_{14}H_{29}$; n=1,2,3; x is 1-10, y is 0-200, z is 4-200, more preferably from about 5 to 60, and most preferably from about 5 to 40.

The present invention is further directed toward a process for emulsifying solvent borne alkyd polymers comprising the addition of one or more of surfactants of formula I or II to a solventborne alkyd, adding water and emulsifying through an inversion process, followed by solvent removal from the aqueous emulsion.

DETAILED DESCRIPTION OF THE PREFERRED EMBODIMENT(S)

The present invention thus involves synthesizing a special surfactant or emulsifier preferably using styrenated phenol as the hydrophobe. Styrenated phenol is commercially obtained as a mixture of mono-, di-, and tristyrenated phenols in various ratios. Styrenated phenol is a polyaromatic hydrophobe, so these surfactants have good affinity for the aromatic groups in the alkyd. They are also inherently lower foaming than most linear surfactants.

The mixture of styrenated phenols are converted into reactive surfactants by first reaction with one or more equivalents of allyl glycidyl ether. This attaches pendant allyl groups for subsequent curing through fatty acid double bonds on the alkyd. These substituted styrenated phenols are oxyalkylated with ethylene oxide (EO), optionally together with propylene oxide (PO) or butylene oxide (BO). Other alkylene oxides may also be used, for example long chain ex-olefin oxides, but EO, and PO or BO are preferred, EO and PO being most preferred. The surfactants are designed by selecting the EO/PO or BO architecture to produce a product that emulsifies, disperses and stabilizes the alkyd resin or hybrid latex/alkyd resin, without conferring hydrophilic properties and to minimize its affinity for chelating metal ions used in the alkyd drying process. The nonionic emulsifier comprises ethylene oxide and propylene oxide residues in a heteric, block, or block heteric arrangement.

A method for making ionic surfactants is to make them anionic by the addition of an anionic group such as a sulfate or a phosphate group onto the terminus of a polyoxyalkylated fatty acid or alcohol. The anionic character gives it the ability to charge stabilize alkyd emulsions.

In general the surfactants may be envisioned as having at least two portions; a first portion which is hydrophobic and which will promote formation of a clear coating during coalescence of alkyd resin from aqueous dispersion, and a second portion which is hydrophilic. At least one of these two portions, generally the hydrophobic portion, must contain unsaturation, which is reactive with alkyd resins during cure. It is well known and accepted that nonionic surfactants are excellent products to emulsify and disperse a wide range of hydrophobic compounds including alkyd resins. Nonionic surfactants outperform anionic surfactants in making stabilizing emulsions as demonstrated by improved water sensitivity, better colloidal stability, and lower foam profile when compared to an emulsion made with an anionic surfactant. In some cases, those skilled in the art of making emulsions, a small amount of anionic surfactant is used in conjunction with the nonionic surfactant.

Alkyd resins are synthesized with drying oils as a major part of the formulation. Drying oils are liquid vegetable or fish oils that react with oxygen to form solid films. Drying oils are raw materials for binders such as alkyd resins and epoxy esters. When these films are exposed to air, such as when the coating is curing, an autoxidative cross-linking reaction takes place. When a film is applied to a substrate, internal, naturally present hydroperoxides decompose to form free radicals. Hydrogen molecules on methylene groups between double bonds are particularly susceptible to abstraction, yielding a resonance-stabilized free radical that reacts with oxygen to give predominantly conjugated peroxy free radicals. The peroxy free radicals can abstract hydrogen molecules from other methylene groups between double bonds to form additional hydroperoxides and generate free radicals. Thus, a cross-linking chain reaction is established, resulting from autoxidation and the coating is cured.

EXAMPLES

The following examples are intended to demonstrate the usefulness of the compositions of the present invention and should not be construed to limit the scope of the invention in anyway.

Example 1

Distyrenated phenol (DSP) (694 g, 1 equivalent) was added to a stainless steel autoclave along with allyl glycidyl ether (AGE) (494 g, 2 equivalents) and potassium hydroxide KOH (2.3 g) and the autoclave sealed and heated to 105 C. When all of the AGE was consumed, the reaction mass was cooled, and the product discharged. This is AGE 2 DSP adduct. 1680 g of this AGE 2 DSP adduct (1 equivalent) was added to another autoclave and heated to 105 C. Ethylene oxide (2026 g, 15 equivalents) was then added over the course of several hours. After all of the EO was consumed, the reaction mass was cooled and the catalyst neutralized with the addition of a small amount of acid. This material is Example 1 (aka ERS 01617).

Example 2

Example 1 ethoxylate was sulfated with sulfamic acid in a glass reactor equipped with a stirrer, thermometer, and reflux condenser by heating to 120 C until the % sulfate was >90%. The product, Example 2 (aka ERS 01618), was isolated as the ammonium salt.

Example 3

Example 1 ethoxylate was phosphated with phosphoric anhydride (P2O5) following standard methods to produce Example 3 in its acid form as a viscous liquid.

Example 4

Emulsion Preparation Procedure with Solvent Stripping

| CP-14 Emulsion | | |
| --- | --- | --- |
| Material | % By Weight | Amount Used |
| short oil alkyd, 75% solids in methyl propyl ketone solvent (available as Beckosol 6422-K3-75 from Reichhold) | 49.4% | 741 g |
| Example 2 | 4.0% | 60 g |
| Ammonium hydroxide | 0.74% | 11.1 g |
| Deionized water | 45.86% 41% solids | 687.9 g |

Charge short oil alkyd, Example 2, and ammonium hydroxide to a reactor flask equipped with nitrogen sparge, thermocouple, overhead mixing, and a condenser and start stirring. Once the mixture is homogenous, begin adding ambient temperature water to the mixture in a slow stream so that the water is incorporated evenly into the mixture. As the water is added the viscosity will rise until the inversion point is met, then the viscosity will begin to drop. When all of the water is charged, allow the emulsion to mix for several minutes and then check the particle size. This emulsion was 41% solids. The average particle size of this emulsion was 0.227 microns with a D50 of 0.209 microns.

The temperature of the emulsion was then raised by heating to 70 C with a nitrogen sparge. The temperature was then gradually increased until vapors were detected in the condenser. The emulsion was then stirred until all of the solvent was removed. After cooling, the particle size, percentage solids, and viscosity were checked. This product emulsion was 48% solids and contained 0.4% residual solvent. The viscosity was not measured, but was quite low. The particle size of the solvent-stripped emulsion was 0.214 microns with a D50 of 0.198 microns.

As the particle size data shows, the particle size of the alkyd emulsion remained very low, actually decreasing from the solvent-containing emulsion. The solids content was significantly higher. This result shows that the use of the anionic surfactants of this invention can overcome the viscosity increase problem inherent with the invert emulsion procedure by leaving the solvent in the mixture and then removing it after emulsion formation. The anionic sulfate has sufficient water solubility to perform as an effective emulsifier even at the elevated temperatures needed for practical solvent stripping. This procedure will allow coating manufacturers to convert existing low cost solventborne alkyds to waterborne products containing little or no VOC. This process also produces a product alkyd emulsion with higher solids (active ingredient) than the solvent-containing waterborne emulsion.

Example 5 and Comparative Example

Comparison of Coating Properties between Reactive and Non-Reactive Surfactant

Two waterborne emulsions of a solventborne long oil alkyd (Beckosol 10-539 LOA from Reichhold) were prepared using the procedure of Example 4 with the amounts of each ingredient shown in Table 1 below. The only difference was the emulsifier. Both emulsifiers (Example 2 and POE 20 DSP) are styrenated phenol based, have nearly the same ethoxylate chain length, and both are sulfates. The only significant difference between them is that Example 2 is reactive, while POE 20 DSP contains no reactive allyl groups.

After the emulsions were prepared, a cobalt-based drying catalyst package was added to the emulsion and four mil drawdowns were made on steel Q panels. After two weeks the adhesion, pencil hardness, gloss, and water contact angle were checked. Results are in Table 2.

TABLE 1

| Example 5 | Amount | Comparative Example 5 | Amount |
|---|---|---|---|
| Long oil alkyd (Beckosol 10-539) | 38.2 g | Long oil alkyd (Beckosol 10-539) | 38.2 g |
| Example 2 | 1.8 g | POE 20 styrenated phenol | 1.8 g |
| Ammonium Hydroxide | 0.6 g | Ammonium Hydroxide | 0.6 g |
| Water | 58.8 g | Water | 58.8 g |
| Drier package | 0.6 g | Drier package | 0.6 g |

TABLE 2

| Property | Example 5 | Comparative Example 5 |
|---|---|---|
| Cross-cut adhesion | 0B (100% fail) | 0B (100% fail) |
| Pencil Hardness | F | 2B |
| Gloss (60°) | 117 | 113 |
| Water contact angle | 84.5° | 79° |

Review of the data in Table 2 shows that Example 5, the alkyd coating with the reactive surfactant, has a higher water contact angle than Comparative Example 5, the alkyd coating with the non-reactive surfactant. This indicates that the Example 5 coating is more water repellent, evidence that the reactive surfactant is cured into the alkyd and not available to dissolve into the water and reduce its surface tension.

The Example 5 coating with the reactive surfactant is also significantly harder than the one with non-reactive surfactant. Presumably, this is due to the plasticization of the coating by the unbound surfactant.

The gloss of the coating is also higher with the reactive surfactant. This suggests that the surface has fewer defects.

Water drops were placed on each of these drawdown panels and allowed to stand covered so that they would not evaporate. The water drop on the Comparative Example 5 coating with the non-reactive surfactant had significantly wet the coating and had spread out to cover a much larger area than the drop on the reactive surfactant coating. After two days, rust on the panel was clearly visible on the panel with non-reactive surfactant (FIG. 1). The coating with the reactive surfactant resisted the ingress of water and protected the steel much better than did the non-reactive.

Example 6

In another test of adhesion, 4 mil drawdowns were made of Example 4 aqueous short oil alkyd emulsion prepared with Example 2 difunctional reactive surfactant and of Synaqua 4804, a commercially available waterborne short oil alkyd (available from Arkema) assumed not to contain a reactive surfactant. Both alkyd emulsions were catalyzed prior to drawdown with the same drier package. After 24 hours of drying, the adhesion of the coatings was measured by ASTM Method D 3359-08 "Measuring Adhesion by Tape Test." A crosscut pattern was scribed onto the alkyd surfaces. The attempt to scribe the crosscut pattern on the commercial alkyd coating failed, while it was successful on the alkyd emulsified with Example 2 reactive surfactant.

Examples 4, 7 and Comparative Example

In another test of adhesion to metal, two short oil alkyd emulsions were prepared following the method of Example 4. One was a repeat of Example 4, while Example 7 used a mixture of Example 2 and Example 3 as emulsifiers. More water was required to prepare the emulsion of Example 7 to produce a suitable viscosity. After Example 4 and Example 7 emulsions were made they were heated to 80-90 C and the solvent was removed until the solvent content was less than 0.5%. A commercially available metal catalyst drier package was added to each emulsion prior to drawdown. The recipes for each example and their particles sizes after solvent removal are given in Table 3.

TABLE 3

| | Example 4 | Example 7 | Comparative commercial waterborne short oil alkyd |
|---|---|---|---|
| Short oil alkyd (Beckosol 6422-K3-75) | 49.4% | 39.5% | Synaqua 4804 (Arkema) |
| Example 2 | 4.0% | 3.16% | 0 |
| Example 3 | 0 | 0.8% | 0 |
| Ammonium Hydroxide | 0.74% | 1.2% | 0 |
| DI H2O | 45.86% | 55.34% | 0 |
| Dura Chemicals DriCAT 507 | 0.5% on Batch Weight | 0.5% on Batch Weight | 0.5% on Batch Weight |
| pH | 7.5 | 7.5 | 7.5 |
| Particle Size | | | |
| D10 | 0.154 | 0.317 | 0.180 |
| D50 | 0.198 | 2.418 | 0.226 |
| D90 | 0.280 | 4.580 | 0.296 |

Two aluminum and two steel panels were prepared prior to making drawdowns of each emulsion. One of each panel was wiped clean with acetone and one of each was scuffed with an abrasive plastic pad. A 4 mil drawdown was cast on each panel and allowed to air dry at room temperature. The 60° gloss on all panels for each emulsion was >100.

After one week the adhesion of the coating to the metal panel was tested following the ASTM Method D 3359-08 "Measuring Adhesion by Tape Test." All of the drawdowns of Examples 4 and 7 passed the adhesion test as did the comparative example on the scuffed steel panel. The comparative waterborne alkyd failed the adhesion test when applied to the acetone cleaned aluminum panel.

Example 8

A short oil alkyd emulsion was prepared following the procedure and materials of Example 4 but without the solvent removal step. Another emulsion of the same alkyd was prepared in identical fashion except that another reactive surfactant, a commercially available alkoxylate of linseed fatty acid, was used instead of the Example 2 styrenated phenol surfactant. Equal amounts of the same metal drier catalyst package (DriCat 507) were added to each emulsion.

The drying time of these two catalyzed emulsions were measured by drawing down films of each on a Leneta chart and allowing them to air dry at room temperature. The alkyd emulsion with the Example 2 reactive surfactant cured tack-free after 5.5 hours, while the linseed alkoxylate coating was not tack-free even after eight hours.

All patents, patent applications and publications cited in this application including all cited references in those patents, applications and publications, are hereby incorporated by reference in their entirety for all purposes to the same extent as if each individual patent, patent application or publication were so individually denoted.

While the many embodiments of the invention have been disclosed above and include presently preferred embodiments, many other embodiments and variations are possible within the scope of the present disclosure and in the appended claims that follow. Accordingly, the details of the preferred embodiments and examples provided are not to be construed as limiting. It is to be understood that the terms used herein are merely descriptive rather than limiting and that various changes, numerous equivalents may be made without departing from the spirit or scope of the claimed invention.

What is claimed is:

1. A method for forming a coating comprising:
providing a coating composition comprising:
at least one alkyd resin as a dispersed phase;
an emulsifier, comprising at least one polyoxyalkylene emulsifier of Formula I or II;

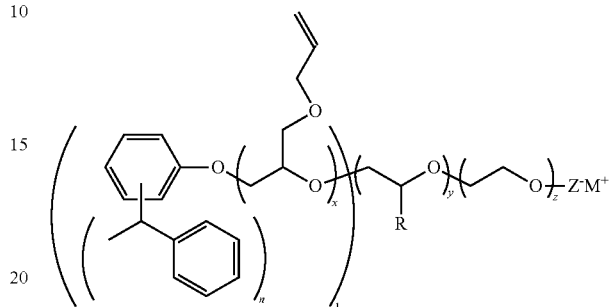

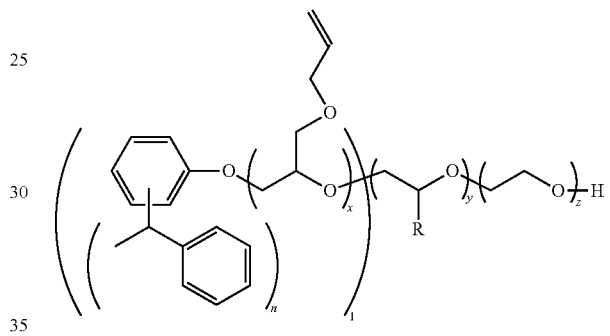

wherein:
n is 1, 2, or 3;
x is 1-10;
y is 0-200;
z is 4-200;
$Z^-$ is $SO_3-$ or $PO_3^{2-}$;
M+ is Na+, K+, $NH_4$+ or an alkanolamine; and
R is $CH_3$, $CH_2CH_3$, $C_6H_5$ or $C_{14}H_{29}$; and
a sufficient amount of water to maintain said alkyd resin in said dispersed phase;
applying said coating composition to a surface;
removing said water wherein upon said removing of said water said alkyd resin and said emulsifier cure wherein said cure comprises cross-linking of said alkyd resin and said emulsifier or autoxidation of said alkyd resin and said emulsifier.

2. The method for forming a coating of claim 1, wherein said emulsifier is a mixture of nonionic and anionic surfactants of Formulae I and II.

3. The method for forming a coating of claim 1, wherein said emulsifier of Formula I is a sulfate ester.

4. The method for forming a coating of claim 1, wherein said emulsifier of Formula I is a phosphate ester.

5. The method for forming a coating of claim 1, wherein said emulsifier of Formula II contains ethylene oxide and propylene oxide residues in a heteric, block, or block heteric arrangement.

6. A method for applying a protective coating to a substrate comprising the application of a coating composition to a substrate wherein said coating composition comprises:

(a) at least one alkyd resin as a dispersed phase;
(b) an emulsifier, comprising at least one polyoxyalkylene emulsifier of Formula I or II:

$$\left(\left(\bigcirc\right)_n\bigcirc\left(\bigcirc\right)_x\left(\bigcirc\right)_y\left(\bigcirc\right)_z Z^-M^+\right)_1 \quad I$$

$$\left(\left(\bigcirc\right)_n\bigcirc\left(\bigcirc\right)_x\left(\bigcirc\right)_y\left(\bigcirc\right)_z H\right)_1 \quad II$$

and
(c) water;
wherein:
n is 1, 2, or 3;
x is 1-10;
y is 0-200;
z is 4-200;
$Z^-$ is $SO_3^-$ or $PO_3^{2-}$;
$M^+$ is $Na^+$, $K^+$, $NH_4^+$ or an alkanolamine; and
R is $CH_3$, $CH_2CH_3$, $C_6H_5$ or $C_{14}H_{29}$; and
allowing the coating composition to dry in air and cure wherein said cure comprises cross-linking of said alkyd resin and said emulsifier or autoxidation of said alkyd resin and said emulsifier.

7. The method of claim 6, wherein the emulsifier is a mixture of nonionic and anionic surfactants of Formulae I and II.

8. The method of claim 6, wherein the emulsifier of Formula I is a sulfate ester.

9. The method of claim 6, wherein the emulsifier of Formula I is a phosphate ester.

10. The method of claim 6, wherein said emulsifier of Formula II contains ethylene oxide and propylene oxide residues in a heteric, block, or block heteric arrangement.

11. The method of claim 6 wherein said z is 5-60.

12. The method of claim 9 wherein said z is 5-40.

13. A method for forming a coating comprising:
providing a coating composition comprising:
at least one alkyd resin as a dispersed phase;
an emulsifier, comprising at least one polyoxyalkylene emulsifier of Formula I or II;

$$\left(\left(\bigcirc\right)_n\bigcirc\left(\bigcirc\right)_x\left(\bigcirc\right)_y\left(\bigcirc\right)_z Z^-M^+\right)_1 \quad I$$

$$\left(\left(\bigcirc\right)_n\bigcirc\left(\bigcirc\right)_x\left(\bigcirc\right)_y\left(\bigcirc\right)_z H\right)_1 \quad II$$

wherein:
n is 1, 2, or 3;
x is 1-10;
y is 0-200;
z is 4-200;
$Z^-$ is $SO_3^-$ or $PO_3^{2-}$;
$M^+$ is $Na^+$, $K^+$, $NH_4^+$ or an alkanolamine; and
R is $CH_3$, $CH_2CH_3$, $C_6H_5$ or $C_{14}H_{29}$; and
a sufficient amount of water to maintain said alkyd resin in said dispersed phase;
applying said coating composition to a surface;
removing said water wherein upon said removing of said water said alkyd resin and said emulsifier cure,
wherein said cure comprises cross-linking of said alkyd resin and said emulsifier.

14. The method for forming a coating of claim 13, wherein said emulsifier is a mixture of nonionic and anionic surfactants of Formulae I and II.

15. The method for forming a coating of claim 13, wherein said emulsifier of Formula I is a sulfate ester.

16. The method for forming a coating of claim 13, wherein said emulsifier of Formula I is a phosphate ester.

17. The method for forming a coating of claim 13, wherein said emulsifier of Formula II contains ethylene oxide and propylene oxide residues in a heteric, block, or block heteric arrangement.

18. A method for forming a coating comprising:
providing a coating composition comprising:
at least one alkyd resin as a dispersed phase;
an emulsifier, comprising at least one polyoxyalkylene emulsifier of Formula I or II;

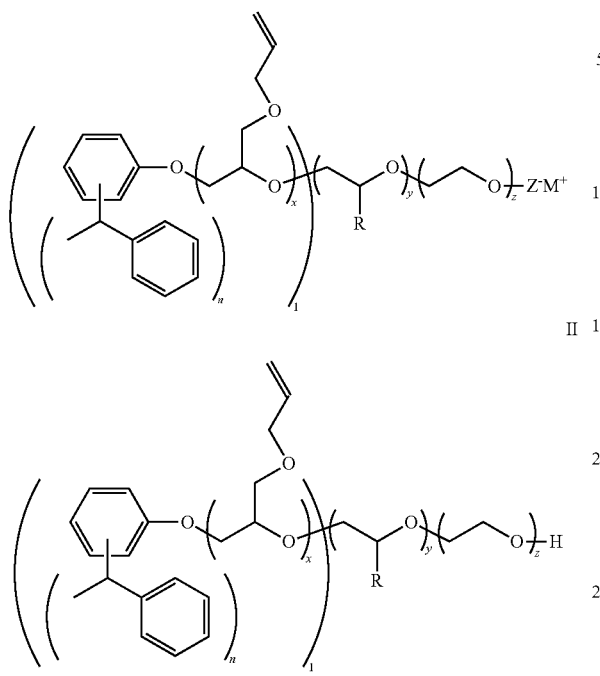

wherein:
n is 1, 2, or 3;
x is 1-10;
y is 0-200;
z is 4-200;
$Z^-$ is $SO_3-$ or $PO_3^{2-}$;
M+ is Na+, K+, $NH_4+$ or an alkanolamine; and
R is $CH_3$, $CH_2CH_3$, $C_6H_5$ or $C_{14}H_{29}$; and
a sufficient amount of water to maintain said alkyd resin in said dispersed phase;
applying said coating composition to a surface;
removing said water wherein upon said removing of said water said alkyd resin and said emulsifier cure,
wherein said cure comprises autoxidation of said alkyd resin and said emulsifier.

19. The method for forming a coating of claim 18, wherein said emulsifier is a mixture of nonionic and anionic surfactants of Formulae I and II.

20. The method for forming a coating of claim 18, wherein said emulsifier of Formula I is a sulfate ester.

21. The method for forming a coating of claim 18, wherein said emulsifier of Formula I is a phosphate ester.

22. The method for forming a coating of claim 18, wherein said emulsifier of Formula II contains ethylene oxide and propylene oxide residues in a heteric, block, or block heteric arrangement.

* * * * *